United States Patent
Miller et al.

(10) Patent No.: US 9,118,937 B2
(45) Date of Patent: Aug. 25, 2015

(54) REAL-TIME VIDEO TRANSMISSION SYSTEM

(75) Inventors: Martin Miller, Karlsruhe (DE); Wen Zhang, Darmstadt (DE); David Knapp, Austin, TX (US)

(73) Assignee: SMSC Europe GbmH, Karlsruhe (DE)

( * ) Notice: Subject to any disclaimer, the term of this patent is extended or adjusted under 35 U.S.C. 154(b) by 1325 days.

(21) Appl. No.: 12/245,037

(22) Filed: Oct. 3, 2008

(65) Prior Publication Data

US 2009/0094657 A1  Apr. 9, 2009

(30) Foreign Application Priority Data

Oct. 4, 2007 (EP) .................................. 07117895

(51) Int. Cl.
| | |
|---|---|
| *H04J 3/06* | (2006.01) |
| *H04N 21/236* | (2011.01) |
| *H04N 21/2383* | (2011.01) |
| *H04N 21/242* | (2011.01) |
| *H04N 21/434* | (2011.01) |
| *H04N 21/647* | (2011.01) |

(52) U.S. Cl.
CPC ..... *H04N 21/23602* (2013.01); *H04N 21/2383* (2013.01); *H04N 21/242* (2013.01); *H04N 21/4342* (2013.01); *H04N 21/647* (2013.01); *H04N 21/64792* (2013.01); *H04J 3/0626* (2013.01)

(58) Field of Classification Search
CPC ............ H04J 3/0626; H04N 21/23602; H04N 21/2383; H04N 21/64792; H04N 21/4342; H04N 21/647; H04N 21/242
See application file for complete search history.

(56) References Cited

U.S. PATENT DOCUMENTS

| | | | | |
|---|---|---|---|---|
| 4,775,900 | A  * | 10/1988 | Blessinger | ...................... 360/40 |
| 5,045,942 | A  * | 9/1991 | Tsugane et al. | ............... 348/516 |
| 6,611,537 | B1 | 8/2003 | Edens et al. | |
| 7,054,916 | B2 | 5/2006 | Kitamura | |
| 7,123,673 | B2 * | 10/2006 | Czekaj et al. | ................. 375/350 |
| 7,203,225 | B2 * | 4/2007 | Herb et al. | ..................... 375/221 |
| 2002/0027905 | A1* | 3/2002 | Heuer | ........................... 370/386 |
| 2002/0095531 | A1 | 7/2002 | Mori et al. | |
| 2004/0257469 | A1* | 12/2004 | Compton et al. | ............. 348/500 |
| 2006/0104345 | A1* | 5/2006 | Millar et al. | ............. 375/240.01 |
| 2007/0230462 | A1* | 10/2007 | Nakayama | .................... 370/389 |

FOREIGN PATENT DOCUMENTS

| | | |
|---|---|---|
| JP | 2000-092020 | 3/2000 |
| JP | 2003-173614 | 6/2003 |
| KR | 10-2007-0008069 | 1/2007 |
| WO | 2007/093435 | 8/2007 |
| WO | 2007/098412 | 8/2007 |

* cited by examiner

*Primary Examiner* — Robert C Scheibel
*Assistant Examiner* — Lonnie Sweet
(74) *Attorney, Agent, or Firm* — Kevin L. Daffer; Daffer McDaniel LLP

(57) ABSTRACT

A system for transferring real-time video data over a network comprises a video source, a video encoder for encoding and compressing video data supplied by the video source and a first network interface controller for transmitting compressed video data on the network. Furthermore a second network interface controller for receiving compressed video data from the network, a video decoder for decoding the video data received by the second network interface controller, and an image processor for processing and/or displaying the decoded video data from the video decoder are provided. The network controllers are configured for transmitting and receiving data in a continuous data stream which is synchronized with a clock signal and in a format which prescribes a pulse sequence of individual bit groups of which at least one is used for video data.

28 Claims, 2 Drawing Sheets

REAL-TIME VIDEO TRANSMISSION SYSTEM

PRIORITY CLAIM

This US Patent Application claims priority from pending European Patent Application No. 07117895.8 filed on Oct. 4, 2007

BACKGROUND OF THE INVENTION

1. Field of the Invention

The invention relates to real-time video transmission systems for transfer of video data via a communication system, network nodes of the communication system, and a method for transferring real time video data via a communication system, and preferably to a synchronous communication system formed as a ring network of two or more ports coupled in a daisy chain configuration to each another to allow communication.

2. Description of the Prior Art

A generally known communication system permits communication between nodes interconnected by a transmission line. Each node can transmit information and receive information via the transmission line. The communication system of interconnected nodes can be configured to have various topologies, such as a bus, ring, star, or tree topology, or a combination thereof.

A bus topology network is generally regarded as being linear. Transmissions from one node propagate along the transmission line and are received by all other nodes connected to the bus. A ring topology network, however, generally consists of a series of nodes connected to each another by unidirectional transmission links to form a single closed loop. Examples of a ring network are described in IEEE 802.5 and the Fiber Distributed Data Interface (FDDI) standards.

A chosen transmission line between nodes can be either wired or wireless, for example via copper wire, fiber optics, or via a wireless transmission medium.

U.S. Pat. No. 7,054,916 discloses a system for video transmission. Signals from video cameras are processed and assembled to individual information packets which include image information, control information, and header information indicating transmitter and receiver addresses. These information packets are transferred via the network and received by an addressed network node. An addressed network node decompresses and displays the video signals. Owing to the packet oriented transmission, variable latencies occur throughout the network. This is not critical for applications like webcams. In other applications in which video signals of good quality must be transferred with low latency via a network, this is not acceptable.

BRIEF SUMMARY OF THE INVENTION

The problem to be solved by the invention is to improve communication performance in communication systems as described above. When compared with prior art, especially latency and overhead should be significantly reduced to a minimum.

To solve the above problems the invention provides a real-time video transmission system comprising at least: a video source for supplying video data; a video encoder for encoding and compressing video data supplied by the video source; a first network interface controller for transmitting compressed video data into a network having a network clock; a second network interface controller for receiving the compressed video data from the network; a video decoder for decoding the video data received by the second network interface controller; and a video sink for at least one of processing and displaying the decoded video data from the video decoder; wherein the video sink is configured to generate a video clock signal, and to transmit this video clock signal to the second network interface controller; the second network interface controller is configured to relay the video clock signal via the network to the first network interface controller; the first network interface controller is configured to receive the video clock signal from the second network interface controller and to relay the video clock signal to the video source, and the video source is configured to generate video data synchronized with the video clock signal from the first network interface controller.

The invention further provides a real-time video transmission system comprising at least: a video source for supplying video data; a video encoder for encoding and compressing video data supplied by the video source; a first network interface controller for transmitting compressed video data into a network having a network clock; a second network interface controller for receiving the compressed video data from the network; a video decoder for decoding the video data received by the second network interface controller; and a video sink for at least one of processing and displaying the decoded video data from the video decoder; wherein the first network interface controller is configured to generate a clock signal which is synchronized with the network clock, and to transmit the clock signal to the video source; wherein the video source is configured to generate video data synchronized with the clock signal from the first network interface controller; wherein the second network interface controller is configured to generate a clock signal which is synchronized with the network clock, and to transmit the clock signal to the video sink as a video synchronization clock; and wherein the video sink is synchronized with the clock signal from the second network interface controller.

The invention further provides a real-time video transmission system comprising at least: a video source for supplying video data; a video encoder for encoding and compressing video data supplied by the video source; a first network interface controller for transmitting compressed video data into a network having a network clock; a second network interface controller for receiving the compressed video data from the network; a video decoder for decoding the video data received by the second network interface controller; and a video sink for at least one of processing and displaying the decoded video data from the video decoder; wherein the video source is configured to generate video data and a video clock signal synchronous with the supplied video data, and to transmit this video clock signal to the first network interface controller; wherein the first network interface controller is configured to transmit the video clock signal via the network to the second network interface controller; wherein the second network interface controller is configured to receive the video clock signal from the first network interface controller and to relay the video clock signal to the video sink; and wherein the video sink is synchronized with the video clock signal from the first network interface controller.

The invention further provides a network node for transmitting real-time video data into a network, comprising: a video source; a video encoder for encoding and compressing video data supplied by the video source; and a network interface controller for transmitting compressed video data into the network; wherein the network interface controller is configured either to generate a clock signal which is synchronized with a network clock, or to receive a video clock signal from another network node, and to transmit the clock signal to the video source; and wherein the video source is configured to generate video data synchronized with the clock signal from the network interface controller.

The invention further provides a network node for transmitting real-time video data into a network, comprising: a video source; a video encoder for encoding and compressing video data supplied by the video source; and a network interface controller for transmitting compressed video data into the network; wherein the video source is configured to generate video data and a video clock signal synchronous with the supplied video data, and to transmit this video clock signal to the network interface controller; and wherein the network interface controller is configured to relay the video clock signal via the network to another network node.

The invention further provides a network node for receiving real-time video data from a network, comprising: a network interface controller for receiving compressed video data from the network; a video decoder for decoding the video data; a video sink for at least one of processing and displaying the decoded video data; wherein the network interface controller is configured either to generate a clock signal which is synchronized with the network clock, or to receive a video clock signal from another network node, and to transmit the clock signal to the video sink; and wherein the video sink is synchronized with the clock signal from the network interface controller.

The invention further provides a network node for receiving real-time video data from a network, comprising: a network interface controller for receiving compressed video data from the network; a video decoder for decoding the video data; a video sink for at least one of processing and displaying the decoded video data; wherein the video sink is configured to generate a video clock signal, and to transmit this video clock signal to the network interface controller; and wherein the network interface controller is configured to relay the video clock signal via the network to another network node.

The invention further provides a method for transferring real-time video data via a network, comprising the following steps: receiving image data from a video source; compressing the image data by means of a video encoder; packing the compressed image data into bit groups of data frames and transmitting the data frames via a network by means of a first network interface controller; receiving the data frames and unpacking the compressed image data from the bit groups by means of a second network interface controller; decompressing the compressed image data by means of a video decoder; and at least one of processing and displaying the decompressed image data by means of a video sink.

BRIEF DESCRIPTION OF THE DRAWINGS

In the following the invention will be described by way of example, without limitation of the general inventive concept, on examples of embodiment with reference to the drawings.

DETAILED DESCRIPTION

Figure 1:
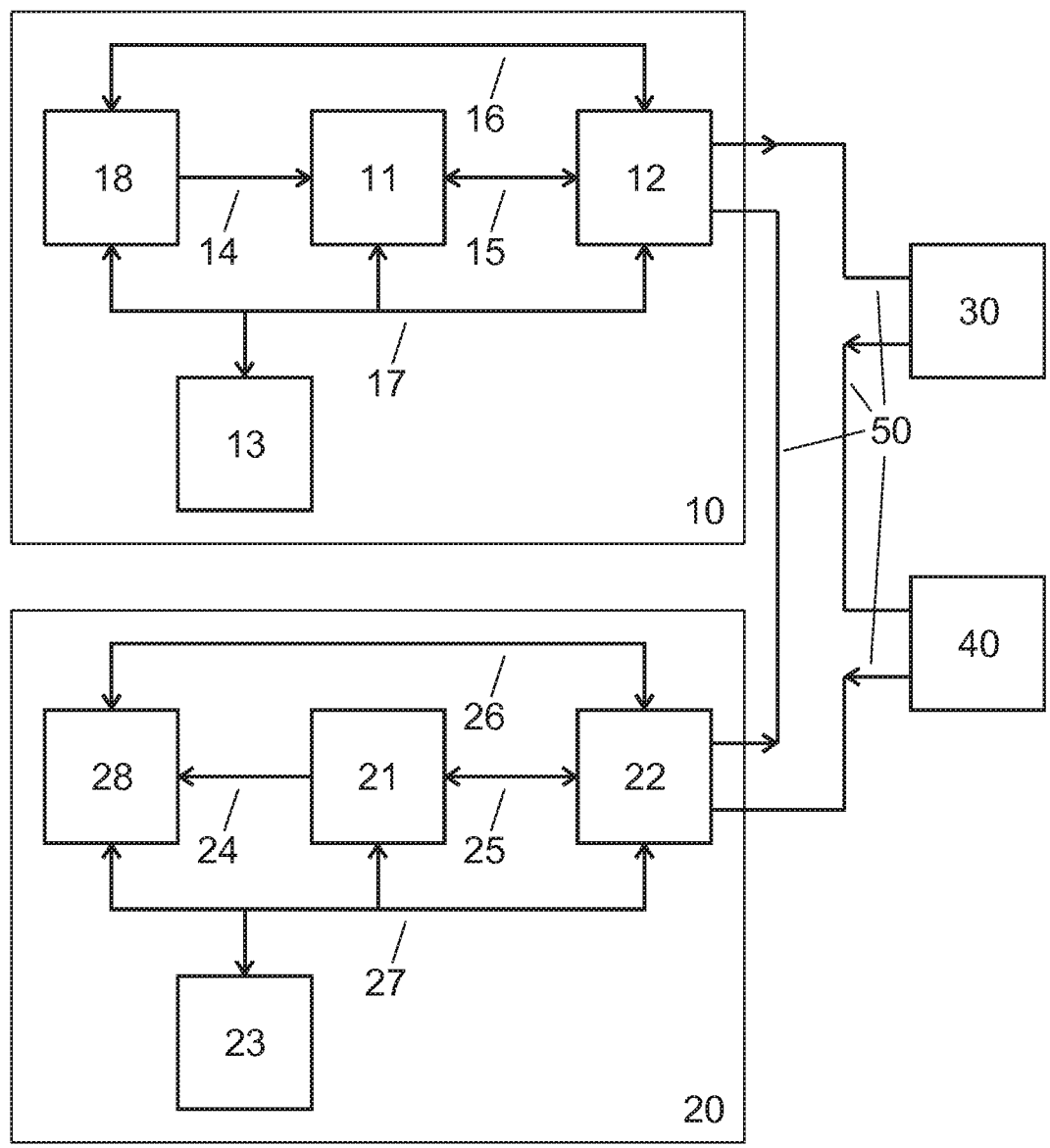
FIG. 1 shows a system according to the invention.

In FIG. 1 a system according to the invention is shown. A first network node 10, a second network node 20, a third network node 30, and a fourth network node 40 are connected via network lines 50 to form a network. It is evident that there may be a different number of network nodes connected to the network. The minimum network comprises the first network node 10 and the second network node 20. The first network node is a camera node comprising a video source like a video sensor array 18 configured as a camera. Image data from the video sensor array 18 is transferred by a video bus 14 to a video encoder 11. This video encoder encodes and compresses the image data received from the video sensor array to bring the image data into a shape which can be easily transferred via the network. The compressed video data is transferred via a local media bus 15 to a network interface controller 12 which sends the data onto the network. In this example a ring network is shown. Data being sent by the network interface controller 12 of the first network node is transmitted via the third network node 30 and the fourth network node 40 to the second network node 20. There it is received by the network interface controller 22. The received data is transmitted via the local media bus 25 to a video decoder 21. This video decoder decodes received data to a format which can be transmitted via the video bus 24 and processed and/or displayed by video sink 28. For synchronizing data on the network, and specifically for synchronizing the video sensor array 18 with the video sink 28, a clocked line 16 is provided at the first network node, which feeds a clock from the network interface controller 12 to the video sensor array 18. Alternatively, the line 16 may be used to transmit a clock from the video sensor array 18 to the network interface controller 12. Furthermore, a clocked line 26 is provided for feeding clocked signals from the network interface controller 22 to the video sink 28. This line 26 may also be used in the opposite direction for transferring clock signals from the video sink 28 to the network interface controller 22. The network controller 12 and the network controller 22 generate synchronous clock signals from the signals which are transmitted via the network. To control the functions of the first network node 10, a host controller 13 is provided which is coupled via a local control bus 17 to the network interface controller 12, the video encoder 11 and the video sensor array 18. For controlling the second network node 20, a host controller 23 is provided which is coupled via a local control bus 27 to a network interface controller 22, the video encoder 21, and the video sink 28.

Figure 2:
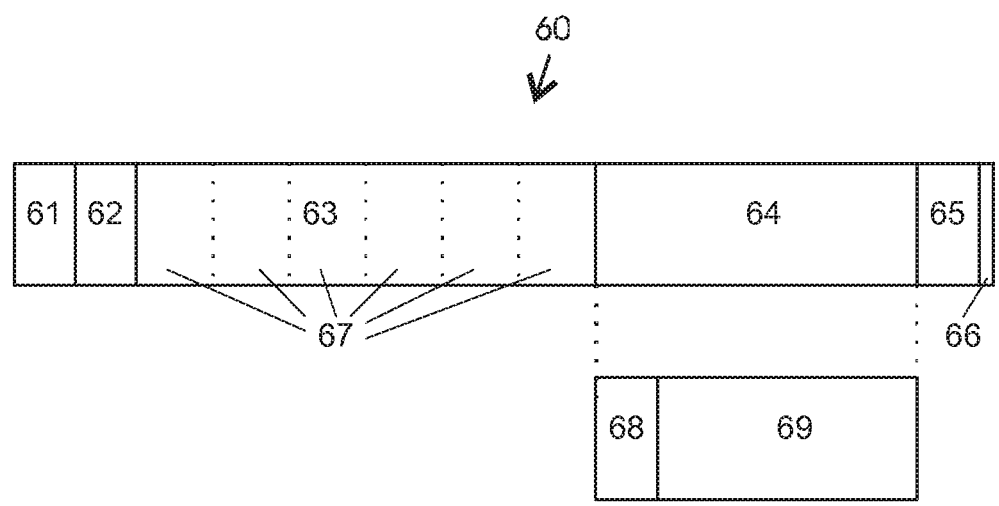
FIG. 2 shows a data frame which is used for transmitting data via the network.

FIG. 2 shows a data frame 60 which is used for transmitting data via the network. A preamble 61 permits the PLL circuit of a network node to lock on to received clock pulses. A data field 62 following the preamble 61 identifies the length of the synchronous data region 63. The synchronous data region is subdivided into a plurality of bit groups 67 of preferably identical length, which are assigned in each case to a specific connection. In general, these bit groups may be assigned to specific connections. A connection is a logical relationship between a data source like the video source 18 and a data sink like the video sink 28. In the example of FIG. 1, there is only one connection from the first network node 10 to the second network node 20. Other bit groups may be used for other video connections. The data transport in any one of the bit groups 67 may also be used for 1:N connections, where a plurality of data sinks use data from the same bit group. The use of a bit group, or a connection, is not bound to a network node or a network interface controller. Any network nodes or any network interface controller may set up a plurality of connections, using a plurality of bit groups 67 for this.

Furthermore, an asynchronous data field 64 serves for transmitting packet data. Each data packet has at least a subscriber address field 68 preceding the data packet field 69. At the end of the bit groups 67, additional control bits 65 and a parity bit 66 may be provided. Transferring of data by a data stream comprising data frames 60 is best achieved by a token ring bus. Synchronous or isochronous data is transferred by transferring video data in the bit groups 67. When a video connection between the first network interface controller 12 and the second network interface controller 22 is set up, any one of the bit groups 67 is assigned for this video connection, thus rendering addressing of data packets unnecessary. Conventional data packets may still be transported by inserting them into the asynchronous data field 64. Data packets in this field comprise at least one subscriber address field 68 preceding the data packet field 69. They may be addressed to any one or a plurality of network interface controllers or network nodes on the bus.

A system in accordance with the invention for transferring real-time video data via a network comprises at least a first network node 10 which is connected by a network 50 to at least a second node 20. The first node comprises a video source 18 which may be a video camera having a video sensor array. Preferably the video source is a digital camera supplying a video output signal, but it may be any other video source as for example a CD player, DVD player or video recorder. Such a video output signal may be an analog signal or a digital signal, for example according to the CCP (Compact Camera Port) standard. The timing of the video output signal is defined by a video clock signal. The video clock signal may be a horizontal sync (h-sync) or vertical sync (v-sync), a pixel-clock, or any other video-related clock. A video encoder 11 processes and encodes the signals from the video source. The video encoder 11 is designed for very low encoding latency, imposing a negligible delay on the output signal. Preferably the latency of the video encoder is less than one frame. Most preferably the latency is less than or equal to 16 lines. The video encoder may be according to the H.264 standard. The output signals of the video encoder 11 are transferred via a first network interface controller 12 (also referred to as NIC 12) to the network. The first network interface controller 12 arranges data from the video encoder in frames which can be transferred via the network. The network node is controlled by a host controller 13 via a common control bus 17.

A second network node 20 is connected via the network to the first network node 10. This network node comprises a second network interface controller 22 (also referred to as NIC 22) which decodes data received via the network; the network data packets are then disassembled. Received data is forwarded to a video decoder 21. This video decoder is also designed for low latency decoding. A video sink 28 receives decoded output video signals from the video decoder 21. The timing of the video output signal is defined by a video clock signal. The video clock signal may be a horizontal sync (h-sync) or vertical sync (v-sync), a pixel-clock, or any other video-related clock. The network node is controlled by a host controller 23 via a common control bus 27. The video sink 28 may be a display, an image processor, or a storage unit like a DVD recorder or video recorder.

The network has a network clock as timing reference for data transfer. This network clock may be a bit clock or a frame clock, or any other stable network related clock.

In a first aspect of the invention, the first network interface controller 12 is configured to generate a video clock signal which is synchronized with the network clock. The network clock is the clock by which individual bits are clocked over the network. It may also be a byte or frame clock. The clock signal derived from the network clock is forwarded to the video source 18 which is configured to generate video data synchronized with the clock signal. Furthermore, the second network interface controller 22 is configured to generate a clock signal which is synchronized with the network clock and to transmit the clock signal to the video sink 28 as a video synchronization clock. The video sink 28 is synchronized with the clock signal from the network interface controller 22.

According to another aspect of the invention, the video sink 28 is configured to generate a video clock signal, and to forward this video clock signal to the second network interface controller 22. This second network interface controller 22 is configured to forward the video clock signal via the network to the first network interface controller 12 which receives the video clock signal and relays the video clock signal to the video source 18. The video source 18 is configured to generate video data synchronized with the video clock signal. Synchronization of the video source 18 with the video sink 28 makes no buffer or only a minimum buffer necessary, because the video data are generated by the video source so that they are suitable for processing by the video sink.

In a further aspect of the invention, the video source 18 is configured to generate video data and a video clock signal synchronous with the supplied video data, and to forward this video clock signal to the first network interface controller 12. The first network interface controller 12 is configured to relay the video clock signal via the network to the second network interface controller 22. The second network interface controller 22 receives the video clock signal and relays it to the video sink 28 which is synchronized with the video clock signal.

In a preferred embodiment of the invention, the video source 18 is designed to generate I-frames only. The definition of I-frames is in accordance with the ISO/IEC 14496-10 (H.264) standard. Use of I-frames only makes it possible to minimize the required buffer size and to reduce the latency significantly. The manufacturing cost can be reduced whilst speed can be increased. Accordingly, decoding of video information can be performed by the video decoder after a significantly shortened time required for receiving and decoding an I-frame. Therefore the video decoder may be designed for decoding I-frames only. Such a video decoder requires a lower amount of buffer space and may decode images faster than a regular video decoder. Owing to lower memory it can be manufactured at lower cost. Encoders and decoders using I-frames only can be used in communication systems according to the invention, because they normally offer enough bandwidth for transferring even less compressed video signals. For achievement of low latency and good quality video signal transmission from the video source 18 to the video sink 28, the network and specifically the network interface controllers 12, 22 preferably meet some additional requirements. The network interface controller 12 preferably is able to transmit data in a continuous data stream comprising data frames 60, which is synchronized with a clock signal which in most cases is not identical with the video clock, and in a format which prescribes a pulse sequence of individual bit groups 67. At least one of these bit groups 67 is used for video data from the video encoder 11. Other bit groups may be used for video data of other video encoders which may be in the same network node 10, or in any other network node. Accordingly, the network interface controller 22 preferably is able to receive these data in a continuous data stream, and to select data from the bit group which is used for transmission of video data. The selected bits are transferred to the video decoder 21.

Alternatively, a non synchronous network may be used. There an additional clock line for transferring the video source clock to the second network node is required.

The network interface controllers effect the data transfer from and to the network. Such a network interface controller may contain also a physical layer interface. Herein the network interface controllers are referenced as units comprising all components to interface with the network. The network interface controllers may comprise a single integrated circuit, or a combination of one or more integrated circuits and discrete components.

In another embodiment of the invention, signal clocks of the video source 18 and the video sink 28 are synchronized. For this purpose the first network interface controller 12 and the second network interface controller 22 have means for generating a synchronous clock via the network. Furthermore, the network is able to transfer synchronous and/or isochronous data streams. A synchronization of clocks may be achieved by synchronizing the signal clock of the video source 18 with the network clock, and furthermore by synchronizing the signal clock of the video sink 28 with the network clock. Additional timing information may be transferred via the network to support clock synchronization.

The video signal transmission according to the invention is especially useful for cameras employed in cars and other vehicles for observation of the environment specifically in front of and behind the vehicle. There a transfer of data from the camera to a display must be achieved without noticeable latency for the user. In addition, the user should obtain an image of good quality without any distortion. It is essential for the user, e.g. the driver of the car, to recognize obstacles before the car hits them.

A network in accordance with the invention preferably has a ring structure of two or more network nodes coupled in a daisy chain fashion. Furthermore, it may be configured as a token ring network, preferably a MOST network.

In another embodiment of the invention, the first network node 10 comprises a first local oscillator that generates a local clock for the video source 18. A second clock is generated by a PLL synchronized with the network clock or the network frame rate. Furthermore, a comparator is provided for determining a phase difference between the frequency of the first local clock and the second clock. This phase difference is transmitted via the network, preferably by use of control bits 65. The second network node 20 comprises a first local oscillator which generates a frequency synchronized with the network clock or the network frame rate. A local clock for the video sink 28 is generated by adding the phase difference which has been transmitted via the network to the signal from the first local oscillator.

The first NIC 12 may use simply a phase comparator for comparing the phase difference between the clock signal of the video source 18 and the network clock. This difference can then be transmitted to the second NIC 22.

Alternatively the phase comparator can transmit either: (i) two sets of phase differences obtained from successive cycles of the network clock; (ii) two sets of phase differences obtained from several separate cycles of the network clock; (iii) changes of phase difference obtained from successive cycles or several separate cycles; or (iv) a frequency difference. The information from the first NIC 12 phase (or frequency) comparator is sent to the second NIC 22 via the network.

The change of phase difference can be calculated for successive cycles of the network clock, or possibly for N cycles separated from each other. Calculation for successive cycles will allow frequency difference detection to be made faster than if a calculation must wait until the Nth cycle. However, a calculation based on N cycles separated from each other will increase the frequency difference accuracy or resolution. A bit value for each phase difference, or a bit value representing a change in phase differences, or a bit value representing frequency difference calculated from the change in phase differences can be transmitted across the network to the second NIC 22 in the destination port.

The phase comparator compares relative phase differences between the clock signal of the video source 18 and the network clock. A change in phase difference between one clock signal of the video source 18 (or network clock) and another clock signal of the video source 18 (or network clock) denotes a difference of frequency. The phase information is then forwarded to the destination. The destination port receives phase or frequency information, and then generates its local clock.

The second NIC 22 preferably includes a PLL coupled to produce a clock local to second network node 20 that is locked in phase and frequency with the clock signal of the video source 18, as transmitted across the network.

Owing to the previously described aspects of the invention, a plurality of independent and different video clock signals may be transmitted via the network. It is also possible to switch quickly from a first video clock to a different second video clock.

As described above for the case of transferring a video clock signal from the first network node to the second network node, a video clock signal can also be transferred from the second network node to the first network node. Then the second NIC 22 has a phase comparator and the first NIC 12 has a PLL.

In a further advantageous embodiment of the invention, there is a single integrated circuit comprising the functions of the video encoder 11 and of the video decoder 21. It is not necessary that every integrated circuit performs these two functions at the same time. There are many common features and functions which are necessary for encoding and decoding of video signals.

Furthermore, at least one of the network interface controllers (12, 22) may be a single integrated circuit. It may further have a clock pin for input and/or output of the video clock.

It is of further advantage to reduce the functionality of a standard H.264 encoder to achieve a lower latency. Preferably only I frame encoding is used. Therefore all complex parts and features associated with comparing a frame with its successor/predecessor frame can be eliminated. Furthermore, the functionality may be limited to the H.264 baseline profile.

A further aspect of the invention relates to a network node 10 for transmitting real-time video data on a network. Such a network node may be any of the previously disclosed first network nodes 10. This node may be combined with all previously disclosed embodiments. It comprises a video source 18, a video encoder 11 and a network interface controller 12. The network interface controller may derive a clock for the video source 18 either from a network clock or from a clock signal received from another network node. Such another network node may be a second network node 20 as disclosed above. Alternatively, the network interface controller may be enabled to transmit a video clock signal via the network to another network node, with the video clock signal being generated by the video source.

Another aspect of the invention relates to a network node 20 for receiving real-time video data from a network. Such a network node may be any of the previously disclosed second network nodes 20. This node may be combined with all previously disclosed embodiments. It comprises a video sink 28, a video decoder 21 and a network interface controller 22. The network interface controller may derive a clock for the video sink 28 either from a network clock or from a clock signal received from another network node. Such another network node may be a first network node 10 as disclosed above. Alternatively the network interface controller may be enabled to transmit a video clock signal via the network to another network node, with the video clock signal being generated by the video sink.

A further aspect of the invention relates to a method for transferring real-time video data via a network. This method comprises the following steps: (a) receiving image data from a video source (18); (b) compressing the image data by means of a video encoder (11); (c) packing the compressed image data into bit groups (67) of data frames (60) and transmitting the data frames (60) via a network by means of a first network interface controller (12); (d) receiving the data frames (60) and unpacking the compressed image data from the bit groups by means of a second network interface controller (22); (e) decompressing the compressed image data by means of a video decoder (21); and (f) processing and/or displaying the decompressed image data by means of a video sink (28).

Additional steps may be a transmitting of a video clock onto the network and a receiving of the video clock from the network. An alternative step would be to derive clocks for the video source and/or the video sink from a network clock.

The invention claimed is:

1. A real-time video transmission system comprising at least:
   a first network node, comprising:
      a video source for supplying video data;
      a video encoder for encoding and compressing video data supplied by the video source; and
      a first network interface controller for transmitting compressed video data into a network having a network clock;
   a second network node, comprising:
      a second network interface controller for receiving the compressed video data from the network;
      a video decoder for decoding the video data received by the second network interface controller; and
      a video sink for at least one of processing and displaying the decoded video data from the video decoder, wherein the video sink is configured to generate a video clock signal and to transmit this video clock signal to the second network interface controller; and
   a data line coupled to the first and second network interface controllers;
   wherein the second network interface controller is configured to arrange the video clock signal in a data frame and transmit the data frame via the data line to the first network interface controller;
   wherein the first network interface controller is configured to receive the data frame from the data line, dissemble the data frame, and relay the video clock signal to the video source; and
   wherein the video source is configured to generate video data synchronized with the video clock signal from the first network interface controller; and
   wherein the real-time video transmission system is absent a clock signal line coupled to the first network node.

2. The real-time video transmission system according to claim 1, wherein at least one of the video encoder and the video decoder is designed for using I-frames only.

3. The real-time video transmission system according to claim 1, wherein the first network interface controller is configured for transmitting and the second network interface controller is configured for receiving data in a continuous data stream which is synchronized with the network clock and in a format which prescribes a pulse sequence of individual bit groups of which at least one is used for video data.

4. The real-time video transmission system according to claim 3, wherein the data stream comprises data frames having at least a synchronous or isochronous data region.

5. The real-time video transmission system according to claim 4, wherein the synchronous data region comprises a plurality of bit groups preferably having identical length, which are assigned to a specific network node.

6. The real-time video transmission system according to claim 5, wherein at least one of the bit groups is assigned to the first network node and to the second network node.

7. The real-time video transmission system according to claim 1, wherein the first network interface controller and the second network interface controller are configured for synchronous video data transfer or isochronous data transfer via the network.

8. The real-time video transmission system according to claim 1, wherein the network has a ring structure.

9. A real-time video transmission system comprising at least:
   a first network node, comprising:
      a video source for supplying video data;
      a video encoder for encoding and compressing video data supplied by the video source; and
      a first network interface controller for transmitting compressed video data into a network having a network clock, wherein the first network interface controller is configured to generate a video source clock signal which is synchronized with the network clock, and transmit the video source clock signal to the video source; and
   a second network node, comprising:
      a second network interface controller for receiving the compressed video data from the network;
      a video decoder for decoding the video data received by the second network interface controller; and
      a video sink for at least one of processing and displaying the decoded video data from the video decoder;
   wherein the real-time video transmission system is absent a clock signal line coupled to the one of the first and second network nodes;
   wherein the video source is configured to generate video data synchronized with the video source clock signal from the first network interface controller;
   wherein the second network interface controller is configured to generate a video sink clock signal which is synchronized with the network clock, and to transmit the video sink clock signal to the video sink; and
   wherein the video sink is synchronized with the video sink clock signal from the second network interface controller.

10. The real-time video transmission system according to claim 9, wherein at least one of the video encoder and the video decoder is designed for using I-frames only.

11. The real-time video transmission system according to claim 9, wherein at least one network node is provided for generating the network clock.

12. The real-time video transmission system according to claim 9, wherein the first network interface controller is configured for transmitting and the second network interface controller is configured for receiving data in a continuous data stream which is synchronized with the bit clock or the frame clock and is in a format which prescribes a pulse sequence of individual bit groups of which at least one is used for video data.

13. The real-time video transmission system according to claim 12, wherein the data stream comprises data frames having at least a synchronous or isochronous data region.

14. The real-time video transmission system according to claim 13, wherein the synchronous data region comprises a plurality of bit groups preferably having identical length, which are assigned to a specific network node.

15. The real-time video transmission system according to claim 14, wherein at least one of the bit groups is assigned to the first network node and to the second network node.

16. The real-time video transmission system according to claim 9, wherein the first network interface controller and the second network interface controller are configured for synchronous video data transfer or isochronous video data transfer via the network.

17. The real-time video transmission system according to claim 9, wherein the network has a ring structure.

18. A real-time video transmission system comprising at least:
a first network node, comprising:
a video source for supplying video data;
a video encoder for encoding and compressing video data supplied by the video source;
a first network interface controller for transmitting compressed video data into a network having a network clock;
a second network node, comprising:
a second network interface controller for receiving the compressed video data from the network;
a video decoder for decoding the video data received by the second network interface controller; and
a video sink for at least one of processing and displaying the decoded video data from the video decoder;
a data line coupled to the first and second network interface controllers;
wherein the video source is configured to derive a video clock signal from the supplied video data, and transmit the video clock signal to the first network interface controller;
wherein the first network interface controller is configured to arrange the video clock signal and the compressed video data in a data frame and transmit the data frame via the data line to the second network interface controller;
wherein the second network interface controller is configured to receive the data frame from the data line, dissemble the data frame, relay the video clock signal to the video sink, and relay the compressed video data to the video decoder;
wherein the video sink is configured to synchronize processing and displaying decoded video data with the video clock signal; and
wherein the real-time video transmission system is absent a clock signal line coupled to the second network node.

19. The real-time video transmission system according to claim 18, wherein at least one of the video encoder and the video decoder is designed for using I-frames only.

20. The real-time video transmission system according to claim 18, wherein the first network interface controller is configured for transmitting and the second network interface controller is configured for receiving data in a continuous data stream which is synchronized with the network clock and in a format which prescribes a pulse sequence of individual bit groups of which at least one is used for video data.

21. The real-time video transmission system according to claim 20, wherein the data stream comprises data frames having at least a synchronous or isochronous data region.

22. The real-time video transmission system according to claim 21, wherein the synchronous data region comprises a plurality of bit groups preferably having identical length, which are assigned to a specific network node.

23. The real-time video transmission system according to claim 22, wherein at least one of the bit groups is assigned to the first network node and to the second network node.

24. The real-time video transmission system according to claim 18, wherein the first network interface controller and the second network interface controller are configured for synchronous video data transfer or isochronous data transfer via the network.

25. The real time video transmission system according to claim 18, wherein the network has a ring structure.

26. A network node for transmitting real-time video data into a network, comprising:
a video source;
a video encoder for encoding and compressing video data supplied by the video source; and
a network interface controller for transmitting compressed video data into the network;
wherein the video source is configured to generate video data, derive a video clock signal from the generated video data, and transmit the video clock signal to the network interface controller; and
wherein the network interface controller is configured to arrange the video clock signal and the compressed video data into a data frame and relay the data frame via the network to another network node.

27. The network node according to claim 26, wherein the video encoder is designed for using I-frames only.

28. A method for transferring real-time video data via a network, comprising the following steps:
receiving from a video source image data and a video clock signal derived from the image data;
compressing the image data by means of a video encoder;
packing the compressed image data into bit groups of a data frame, packing the video clock signal into a preamble of the data frame and transmitting the data frame via a network by means of a first network interface controller;
receiving the data frame, unpacking the compressed image data from the bit groups, and unpacking the video clock signal from the preamble by means of a second network interface controller;
decompressing the compressed image data by means of a video decoder; and
at least one of processing and displaying the decompressed image data in synchronization with the video clock signal by means of a video sink.

* * * * *